(12) United States Patent
Wado et al.

(10) Patent No.: US 6,698,283 B2
(45) Date of Patent: Mar. 2, 2004

(54) THIN FILM SENSOR, METHOD OF MANUFACTURING THIN FILM SENSOR, AND FLOW SENSOR

(75) Inventors: Hiroyuki Wado, Toyota (JP); Takao Iwaki, Chiryu (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/195,564

(22) Filed: Jul. 16, 2002

(65) Prior Publication Data
US 2003/0010111 A1 Jan. 16, 2003

(30) Foreign Application Priority Data
Jul. 16, 2001 (JP) ........................................ 2001-215656

(51) Int. Cl.[7] ................................................. G01F 1/68
(52) U.S. Cl. ................................................... 73/204.26
(58) Field of Search .......................... 73/204.26, 204.15, 73/204.05, 204.11

(56) References Cited

U.S. PATENT DOCUMENTS

| | | | | |
|---|---|---|---|---|
| 4,884,443 A | * | 12/1989 | Lee et al. ................. | 73/204.16 |
| 4,888,988 A | * | 12/1989 | Lee et al. ................. | 73/204.26 |
| 5,209,119 A | * | 5/1993 | Polla et al. ................. | 73/723 |
| 5,237,867 A | * | 8/1993 | Cook, Jr. ................. | 73/204.15 |
| 5,965,813 A | * | 10/1999 | Wan et al. ................. | 73/204.26 |

* cited by examiner

Primary Examiner—Edward Lefkowitz
Assistant Examiner—Jewel V. Thompson
(74) Attorney, Agent, or Firm—Nixon & Vanderhye PC

(57) ABSTRACT

A flow sensor includes a substrate in which a cavity is formed. A thin film structure is located above the cavity. The thin film structure includes a patterned multilayer film. A dummy film layer is formed or a number of dummy film layers are formed in close proximity to the patterned multilayer film to protect the multilayer film from the effect of reduction gas.

14 Claims, 9 Drawing Sheets

THIN FILM SENSOR, METHOD OF MANUFACTURING THIN FILM SENSOR, AND FLOW SENSOR

CROSS REFERENCES TO RELATED APPLICATIONS

This application relates to and incorporates by reference Japanese patent application No. 2001-215656, which was filed on Jul. 16, 2001.

BACKGROUND OF THE INVENTION

The present invention relates to a thin film sensor having a thin film that includes a pair of insulating films sandwiching a metallic resistor film, a method of manufacturing such a thin film sensor, a flow sensor having the said thin film, and a method of manufacturing such a flow sensor.

Flow sensors, infrared light sensors, and gas sensors are examples of thin film sensors having a resistor film (metallic resistor film), made of metal like platinum, on a micro bridge or a membrane and relying on temperature-dependent changes in resistance in the metallic resistor film for sensing.

In general, such sensors include a lower insulating film, metallic resistor film, and upper insulating film, which are deposited in layers on a substrate to form a thin film. Usually, an adhesion layer consisting of metallic oxide is placed between the lower insulating film and the metallic resistor film to improve adhesion between the metallic resistor film and the insulating film ($SiO_2$ or SiN) and to prevent the metallic resistor film from peeling.

In order to take advantage of temperature-dependent changes in the resistance of the metallic resistor film, the metallic resistor film, along with the adhesion layer underneath, is patterned into serpentine lines for active parts. Wiring used for sensing is made of a patterned multilayer film consisting of the metallic resistor film and the adhesion layer.

The inventors of the present invention have discovered that the thermal coefficient of resistance (TCR) for the serpentine lines decreases as a result of a thermal treatment that takes place after the lower insulating film and the serpentine lines (the adhesion layer made of metallic oxide and the metallic resistor film) are formed on the substrate for a conventional thin film sensor.

Consider an example of a flow sensor in regard to the problem of decreased TCR in the serpentine lines. A conventional thin film flow sensor is shown in FIG. 11 and FIG. 12. FIG. 12 shows patterns for active parts 3, 4 and 5 in the flow sensor.

A thin film (membrane) 10 is formed on a substrate 1, which has a cavity 1a, and covers the cavity 1a. A heater 5 and a temperature sensor 4, which are two of the active parts, are formed on the thin film 10 over the cavity 1a. A flow thermometer 3, which is also an active part, is formed on the thin film 10 on the substrate 1 but not above the cavity 1a.

The active parts 3, 4, 5 are formed into striped patterns. The flow thermometer 3, temperature sensor 4, and heater 5 are placed in that order along the path indicated by the arrow in FIG. 11, which also shows the direction of fluid flow.

In this flow sensor, the heater 5 is activated in such a way that the temperature of the heater 5 is above the fluid temperature, which detected by the flow thermometer 3, by a prescribed level. When the flow is in the direction of the arrow in FIG. 11, the temperature sensor 4 loses heat, and the temperature of the temperature sensor 4 falls. When the flow is in the opposite direction from the arrow, the temperature sensor 4 receives heat, and its temperature increases. It is possible, therefore, to detect the direction of the flow and the rate of flow from the temperature difference between the temperature sensor 4 and the flow thermometer 3. Temperature is measured (detected) from changes in resistance in the metallic lines that include the flow thermometer 3 and the temperature sensor 4.

FIGS. 13A to 13D and FIGS. 14A to 14C show a generally used manufacturing method for such a flow sensor. FIGS. 13A to 13D and FIGS. 14A to 14C show the steps for manufacturing the flow sensor of FIG. 14C. FIG. 14C is a simplified cross sectional view taken along line 14—14 in FIG. 11.

Firstly, as shown in FIG. 13A, a silicon nitride film 21 is deposited by a low pressure CVD method on a surface of a silicon substrate 1. Then, a silicon oxide film 22 is deposited by a plasma CVD method on top of this film to form a lower insulating film 2 that consists of the two layers 21 and 22 (lower insulating film formation step). Next, the film properties of the lower insulating film 2 (stability under stress and strength) are improved by annealing in a furnace with a nitrogen atmosphere (lower insulating film anneal step).

Next, as shown in FIG. 13B, a multilayer film 3c, consisting of a titanium film 3a, an adhesion layer, a platinum film 3b, and a metallic resistor film, stacked in that order, is deposited on the lower insulating film 2 by vapor phase deposition or sputtering. Next, the multilayer film 3c is annealed in a furnace with a nitrogen atmosphere to improve the film characteristics and TCR. With the annealing step, the titanium film 3a turns into a metallic oxide that makes up the adhesion layer (titanium oxide in this example). Next, a resist film 4a, which has patterns corresponding to the active parts 3, 4, 5, is formed on the multilayer film 3c.

As shown next in FIG. 13C, using the resist film 4a as a mask, the multilayer film 3c is etched by, for example, ion milling to form the active parts 3, 4, 5. The steps described so far include a step for depositing the multilayer film 3c, a step for annealing and patterning, a step for forming the adhesion layer 3a consisting of metallic oxide on top of the lower insulating film 2 (adhesion layer formation step), a step for forming a resistor film 3b, consisting of a metal, on top of the adhesion layer (resistor film formation step), and a step for forming the active parts 3, 4, 5 (active part formation step).

Then, a silicon oxide film 61 is deposited by a method such as plasma CVD to cover the active parts 3, 4, 5 on the lower insulating film 2. After an annealing step, which is performed in a furnace with a nitrogen atmosphere, a silicon nitride film 62 is deposited by a method such as low pressure CVD to form an upper insulating film 6, which consists of the two layers 61 and 62 (upper insulating film formation step).

Next, as shown in FIG. 13D, openings 7a are formed in the upper insulating film 6 for forming pads 7 (shown in FIG. 11) for the active parts 3, 4, 5. As shown in FIG. 14A, the pads 7, which are made of, for example, gold (Au), are formed by methods such as vapor phase deposition, sputtering, photolithography, and etching.

As shown in FIG. 14B, a silicon oxide film 8 is formed by, for example, a method such as plasma CVD on the other surface of the silicon substrate 1. This film 8 is then etched to form an opening 8a, which corresponds to the cavity 1a mentioned earlier. Next, as shown in FIG. 14C, the silicon oxide film 8 is used as a mask for anisotropic etching on the silicon substrate 1, so that the cavity 1a is formed and the silicon nitride film 21 on the other side of the silicon substrate 1 is exposed (cavity formation step).

Using the steps described above, it is possible to manufacture the flow sensor shown in FIG. 11. As shown in FIG. 14C, the structure of the flow sensor includes the thin film structure formed over the cavity 1a on the substrate 1, which includes the cavity 1a, with this thin film structure 10 including the lower insulating film 2, adhesion layer 3a consisting of a metallic oxide, metallic resistor film 3b, and upper insulating film 6, which are stacked on top of each other on the substrate 1. Active parts 3, 4, 5 are formed by patterning the multilayer film 3a, consisting of the adhesion layer 3a and the resistor film 3b, into prescribed patterns.

The method of manufacturing described above requires several high temperature process steps after the active parts 3, 4, 5 are formed, including the high temperature deposition step for the upper insulating film 2 and the annealing step for improving the stability and TCR characteristics of the active parts 3, 4, 5 and for improving the insulating films 2 and 6, in terms of strength and stability under stress.

In this manufacturing process, the TCR characteristics of the active parts 3, 4, 5 degrade with the high temperature (approximately 800° C.) used for the low pressure CVD method of depositing the silicon nitride film 62 for the upper insulating film 6 or during the annealing step for the PE-SiN film 62, which follows the deposition of the silicon nitride film 62 by a low temperature plasma CVD process.

The cause of this degradation is thought to be the mechanism illustrated in FIG. 15. Reduction gas agents, such as hydrogen (symbolized by the letter H in FIG. 15), are generated by a source gas during deposition of the silicon nitride film 62 or by the nitride film 62 as this film gets annealed. The active parts 3, 4, 5 are exposed to this reduction gas atmosphere at a high temperature.

As a result of this exposure, the metallic oxide film, which makes up the adhesion layer in the active parts 3, 4, 5 (for example, $TiO_2$), is reduced back to a metal. The reduced metal atoms diffuse into the metallic resistor film (platinum film). As a result, the TCR for the active parts 3, 4, 5 decreases. Therefore, it is necessary to prevent the metallic oxide in the adhesion layer from being reduced.

More specifically, the reaction that takes place during the low pressure CVD process for the silicon nitride film 62 is $SiH_2Cl_2+NH_3 \rightarrow Si_3N_4+H_2+HCl$. Hydrogen is generated, and a large amount of hydrogen is incorporated into the silicon oxide films 22 and 61. On the other hand, when the PE-SiN film, which is formed at a low temperature, is annealed at a high temperature, the PE-SiN film generates hydrogen, which is incorporated into the silicon oxide films 22 and 61.

According to this theorized mechanism, it would be impossible to completely avoid a decrease in the TCR for the active parts 3, 4, 5. Because the active parts 3, 4, 5 are patterned, the reduction gas agent will be incorporated into the silicon oxide films 22 and 61 at areas A (shown in FIG. 15) surrounding the active parts 3, 4, 5, where the active parts 3, 4, 5 are not present, will diffuse through the oxide films, and arrive at the active parts 3, 4, 5.

The metallic oxide film, which makes up the adhesion layer, is reduced to an even higher degree because of the additional reduction gas agent from the areas A. As a result, the TCR values for the active parts 3, 4, 5 decrease significantly.

In a device like a flow sensor, in which the active parts 3, 4, 5 are patterned into several different shapes, the sizes of the areas A (surface area) surrounding the various active parts will differ from one another.

Because of the different roles played by the active parts 3, 4, 5, the serpentine line widths also vary. For example in a flow sensor, the resistance values required for the heater 5, temperature sensor 4 and flow thermometer 3 are determined by the driver circuits. The resistor value for the heater 5 is around several hundred ohms, while the resistor values for the temperature sensor 4 and flow thermometer 3 are several kilo-Ohms.

Because the sizes of the surrounding areas A and the line widths of the active parts vary, different amounts of reduction gas agent are incorporated into different active parts. For this reason, the degree by which the TCR decreases would also be inconsistent among the various active parts. This problem can complicate the design of the driver circuits and should be avoided.

Therefore, thin film sensors in general, including the flow sensor described above, are susceptible to the problem of decreased TCR in the active parts, when these thin film sensors have active parts formed by a multilayer film that includes a lower electrode insulating film on a substrate, an adhesion layer consisting of metallic oxide, a metallic resistor film, and an upper insulating film, which are deposited on top of each other and patterned, because a reduction gas agent is generated during the deposition of the upper insulating film after the active parts are formed and during annealing.

An objective of the present invention, therefore, is to address the problem described above and to minimize decreases in the TCR values in the active parts in a thin film sensor.

SUMMARY OF THE INVENTION

To achieve this objective, the invention is essentially a thin film sensor including a lower insulating film; an adhesion layer, which includes a metallic oxide material; a resistor film, which includes a metal, wherein the adhesion layer and the resistor film form a multilayer film; and an upper insulating film. The lower insulating film, the adhesion layer and the resistor film are stacked on a substrate. The thin film sensor further includes an active part, which is formed by patterning the multilayer film into a predetermined shape, and a dummy film layer, which is made of the same material that the active part is made of. The film layer is located in close proximity to the active part. The dummy film layer protects the active part from the effects of reduction gas.

In another aspect, the invention is a method of manufacturing a thin film sensor including: forming a lower insulating film; forming an adhesion layer, which includes a metallic oxide material, on the lower insulating film; forming a resistor film, which includes a metal, on the adhesion layer, wherein the resistor film and the adhesion layer form a multilayer film. The method further includes forming an active part by patterning the multilayer film into a predetermined shape; forming a dummy film layer simultaneously with the forming of the active part; forming an upper insulating film to cover the active part by forming a silicon nitride film by a plasma CVD method; and annealing the silicon nitride film.

In another aspect, the invention is a method of manufacturing a thin film sensor comprising: forming a lower insulating film; forming an adhesion layer, which is comprised of a metallic oxide material, on the lower insulating film; forming a resistor film, which is comprised of a metal, on the adhesion layer, wherein the resistor film and the adhesion layer form a multilayer film; forming an active part by patterning the multilayer film into a predetermined shape; and forming an upper insulating film to cover the active parts by forming a silicon nitride film by a plasma CVD method; forming through holes to pass through the silicon nitride film; and annealing the silicon nitride film. Reduction gas agent is released easily through the through holes formed in this method.

DETAILED DESCRIPTION OF THE PREFERRED EMBODIMENTS

First Embodiment

Figure 1:
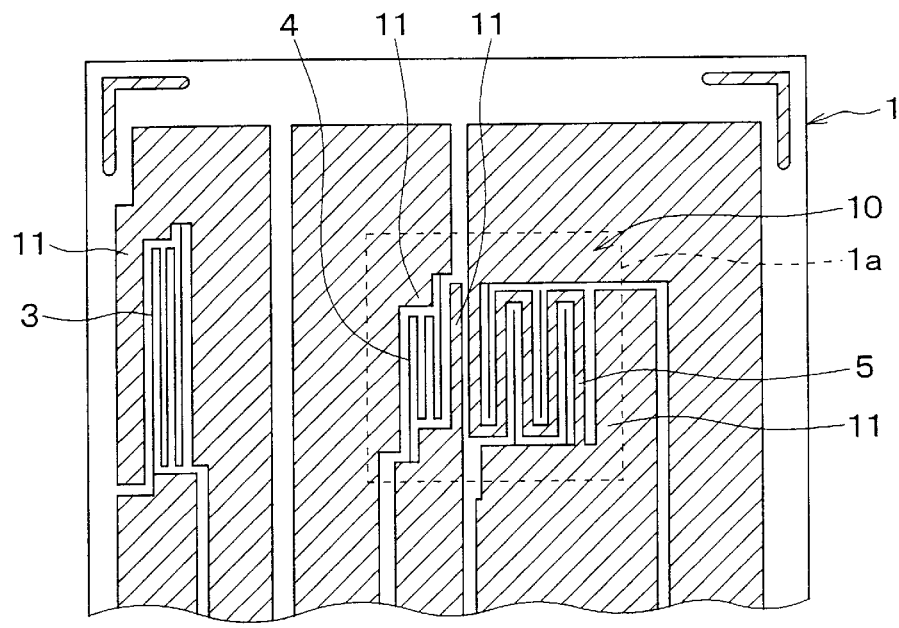
FIG. 1 is a plan view showing key parts of a first example of the flow sensor of the first embodiment of the present invention.
Figure 6:
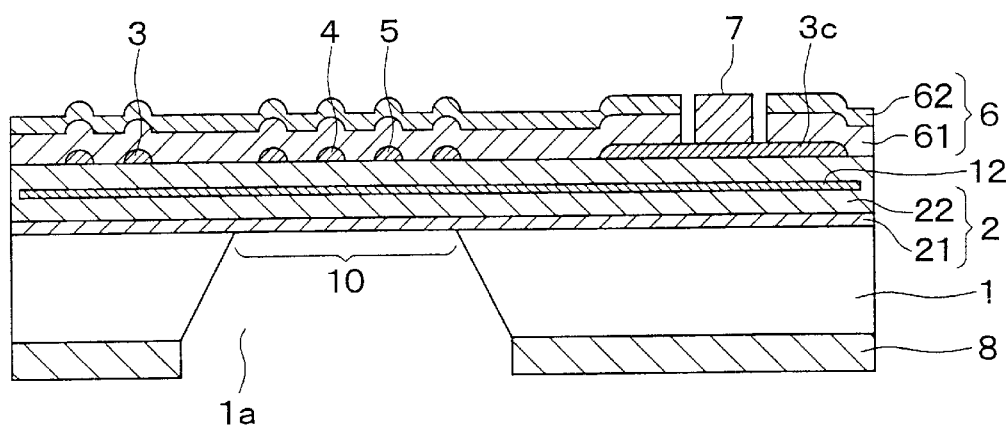
FIG. 6 is a simplified cross sectional view showing a first example of the flow sensor of a second embodiment.

Referring to FIG. 1, a substrate 1 consists of a semiconductor substrate (silicon substrate in this example), such as a single crystal silicon substrate, and includes a cavity 1a, or hollow, which extends through the substrate (See FIG. 6). A thin film structure 10 is formed on the substrate 1 to cover the cavity 1a.

Figure 14A:
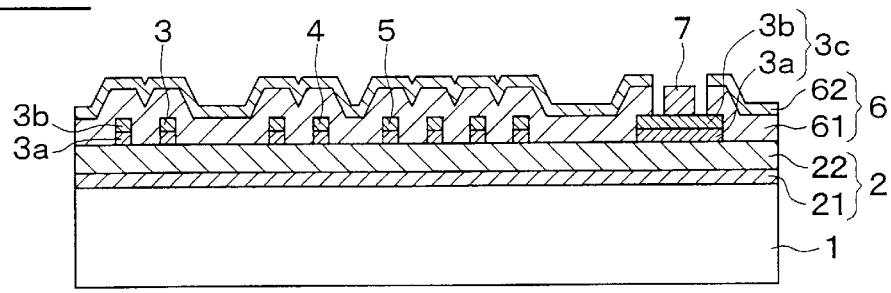
FIGS. 14A to 14C are cross sectional diagrams showing the steps that follow the manufacturing step shown in FIG. 13D.
Figure 14B:
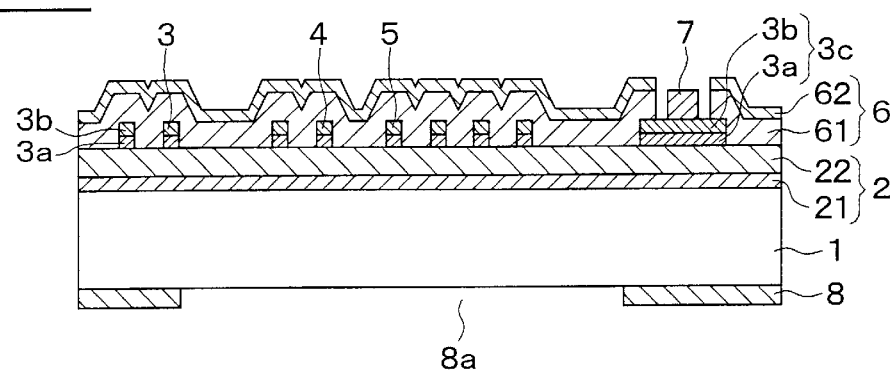
Figure 14C:
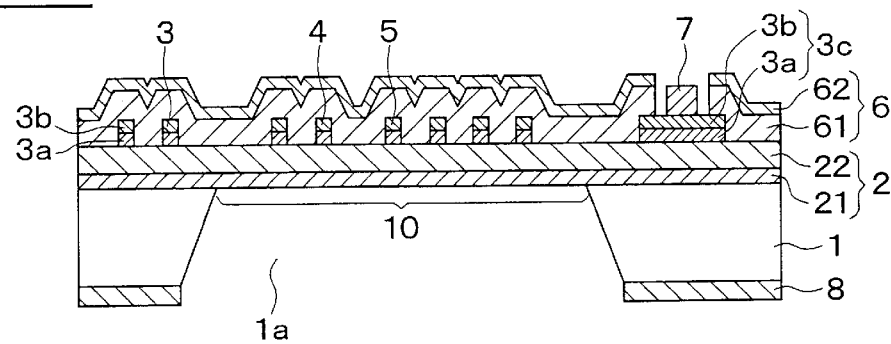

As shown in FIG. 14C, the thin film structure 10 includes a lower insulating film 2 (silicon nitride film 21 and silicon oxide film 22 in this example), an adhesion layer 3a consisting of a metallic oxide (titanium oxide in this example), a resistor film 3b consisting of a metal (platinum in this example), and an upper insulating film 6 (silicon oxide film 61 and silicon nitride film 62 in this example), which are stacked on top of each other on one side of the substrate 1. A multilayer film 3c, which includes an adhesion layer 3a and a resistor film 3b, are patterned into rectangular strips (lines running parallel to each other) to form active parts 3, 4, 5.

In the first example of FIG. 1, dummy film layers 11, which are made of the same material as the active parts 3, 4, 5 (platinum and titanium oxide in this example), are formed on the lower insulating film 2 to completely surround each of the active parts 3, 4 and 5 in the same plane as the active parts 3, 4, 5 (in other words, on the surface of the silicon oxide film 22).

Figure 13A:
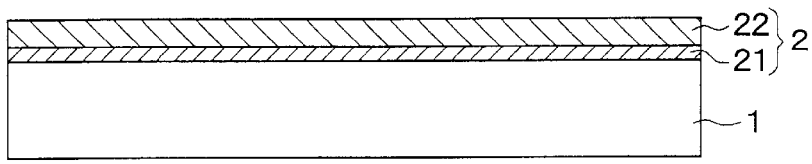
FIGS. 13A to 13D are cross sectional diagrams showing the manufacturing steps of the flow sensor in FIG. 11.
Figure 13B:
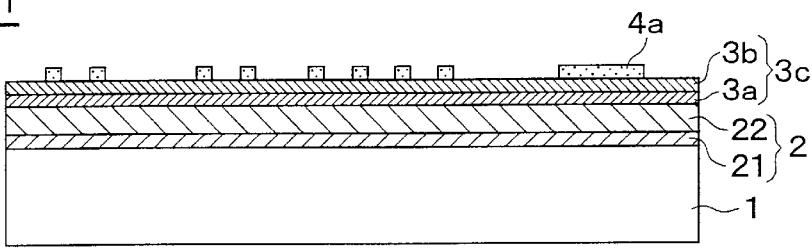
Figure 13C:
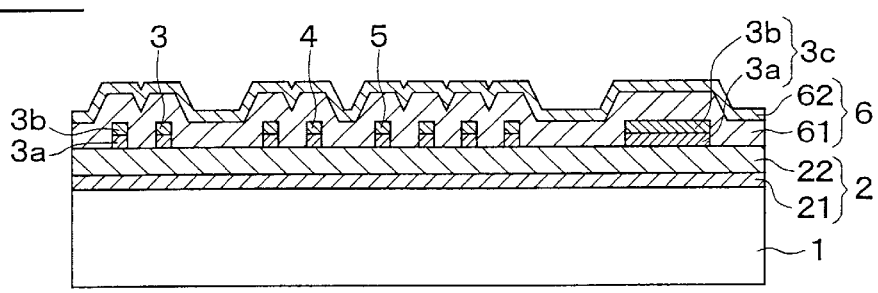
Figure 13D:
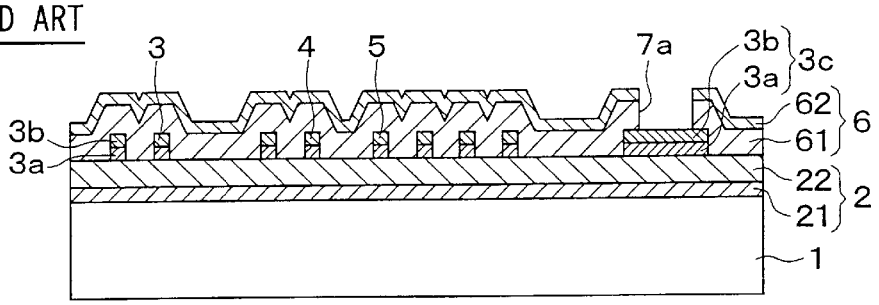

The dummy film layers 11 can be formed at the same time as the active parts 3, 4, 5, (see FIG. 13B) by depositing the multilayer film 3c, which is formed by depositing the titanium film 3a, the adhesion layer, the platinum film 3b, and the metallic resistor film, one after the other, and by annealing and etching the multilayer film 3c, as shown in FIG. 13C. In other words, the mask patterns for the resist film 4a should reflect the active parts 3, 4, 5 and the dummy film layers 11 shown in FIG. 1.

In other words, the flow sensor of the present embodiment can be manufactured with a lower insulating film formation step for forming the lower insulating film 2 on the surface of the substrate 1, an annealing step for the lower insulating film, a step for forming the adhesion layer, a step for forming the resistor film, a step for forming the active parts 3, 4, 5 and the dummy film layers 11, and steps for forming the upper insulating film and the cavity 1a.

A silicon nitride film 62, which is an upper layer in an upper insulating film 6, may be formed by a high temperature, low pressure CVD method (LP-SiN film) or by a low temperature plasma CVD step followed by high temperature annealing (PE-SiN film). With either method, the reduction gas agent, such as hydrogen, mentioned earlier, will be generated.

In this embodiment, the dummy film layers 11, which are made of the same materials as the active parts 3, 4, 5, are formed to completely surround the active parts 3, 4, 5 on the same plane as the active parts 3, 4, 5 on the lower insulating film 2, as shown in FIG. 1, to address the problem of decreased TCR values in the active parts caused by the reduction gas agents.

Because the dummy film layers 11 exist in areas substantially surrounding the active parts 3, 4, 5, where the active parts 3, 4, 5 are not present, the hydrogen reduction gas agent, which is generated during the low pressure CVD process for the silicon nitride film 62 or the upper insulating film 6 or during the anneal step following the plasma CVD process, will be consumed by the dummy film layers 11.

In other words, the reduction gas agent, such as hydrogen concentrating at the dummy film layers 11, will be consumed by reducing the metallic oxide material (titanium oxide in the platinum/titanium oxide layers) that make up the dummy film layers 11.

Because a smaller amount of reduction gas agent, which would decrease the TCR values in the active parts 3, 4, 5, reaches the active parts 3, 4, 5, the decline in the TCR values in the active parts 3, 4, 5 is minimized.

Figure 2:
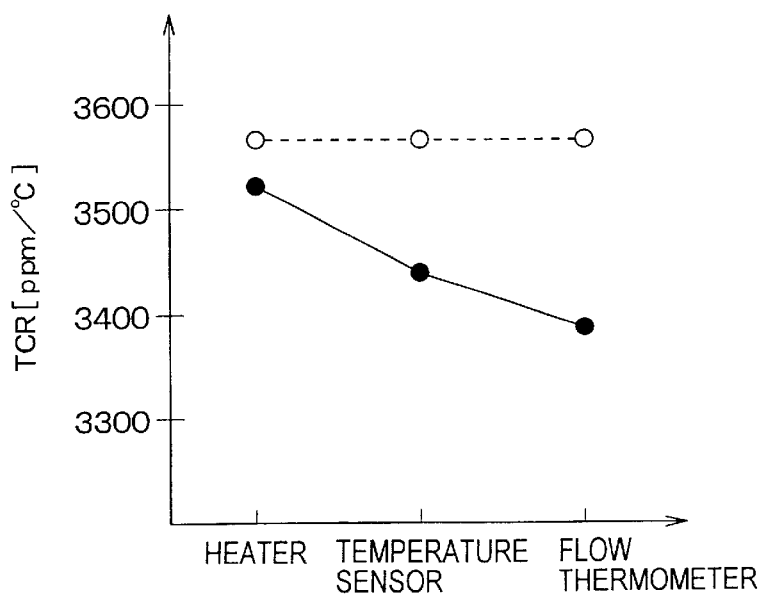
FIG. 2 is a graph showing the effects of the first example of the first embodiment in suppressing decreases in the TCR values.
Figure 12:
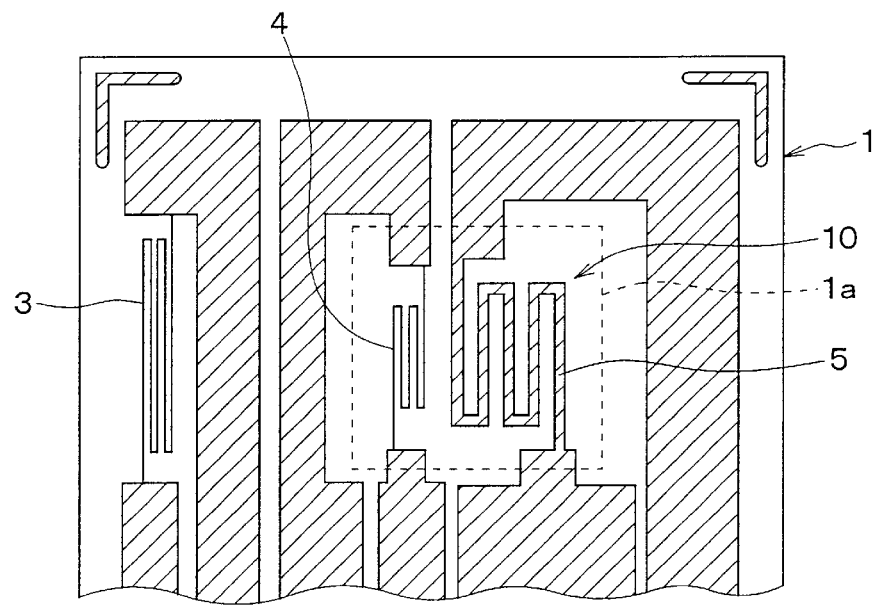
FIG. 12 is a plan view showing serpentine patterns for the active parts in the flow sensor in FIG. 11.
Figure 15:
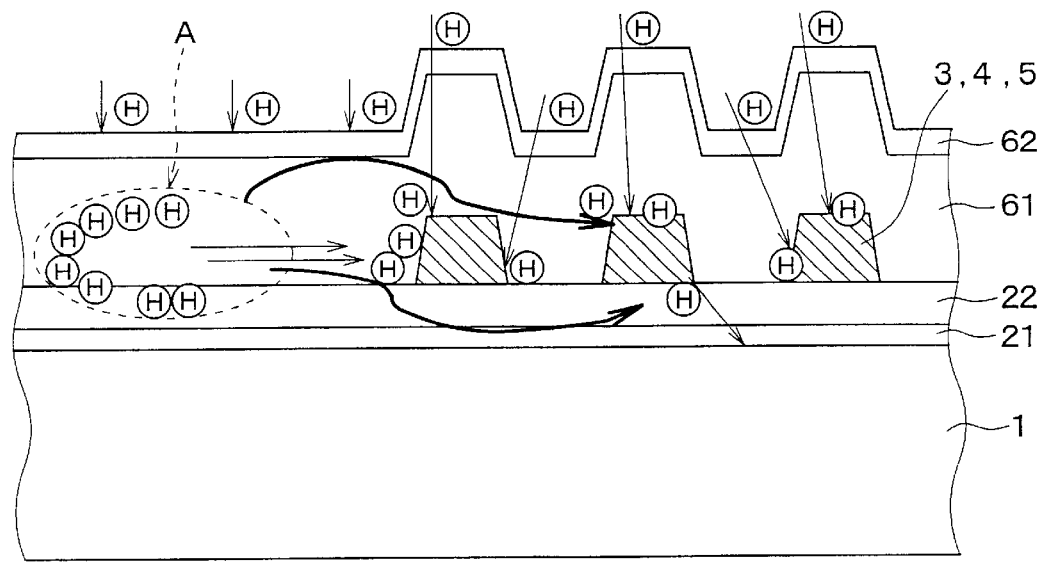
FIG. 15 is a cross sectional diagram illustrating a theory of how the TCR values decrease in the active parts.

FIG. 2 illustrates the degree to which the TCR values are reduced between the first example of the present embodiment shown in FIG. 1 and the conventional example shown in FIG. 12. Compared with the conventional example, the TCR values of the present embodiment are improved. Furthermore, TCR non-uniformity among the various parts of the active parts 3, 4, 5 is minimized. The effects of the dummy film layers 11 are obvious.

In the conventional example, the degree to which the TCR values decline among the active parts 3, 4, 5 is the smallest for the heater 5, followed by the temperature sensor 4, and finally by the flow thermometer 3, because the heater 5 has the largest line width among the active parts. While the line widths are approximately the same for the temperature sensor 4 and the flow thermometer 3, the flow thermometer 3 is surrounded by a larger area without the presence of active parts (areas A), which can incorporate a larger amount of reduction gas agent.

Furthermore, the dummy film layers 11 are formed on the lower insulating film 2 on the same plane as the active parts 3, 4, 5 with the same materials as the active parts 3, 4, 5. As mentioned earlier, the dummy film layers 11 can be formed simultaneously with the active parts 3, 4, 5 by simply modifying the mask patterns. As a result, the manufacturing process can be simplified without adding an extra step for specifically forming the dummy film layers 11.

In the present embodiment, it is not necessary to have the dummy film layers 11 completely surround the active parts 3, 4, 5. It is possible to have the dummy film layers 11 surround only parts of the active parts 3, 4, 5 on the lower insulating film 2 on the same plane as the active parts 3, 4, 5. Even then, the dummy film layers 11 help suppress the decline in the TCR values in the active parts 3, 4, 5 just as in the first example shown of FIG. 1.

Figure 3:
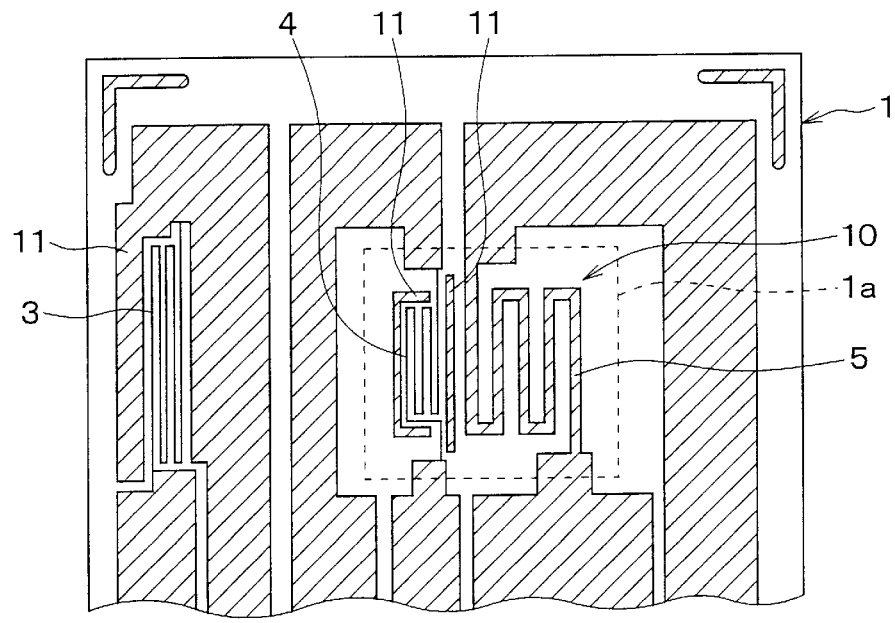
FIG. 3 is a plan view showing key parts in a second example of the flow sensor of the first embodiment.
Figure 4:
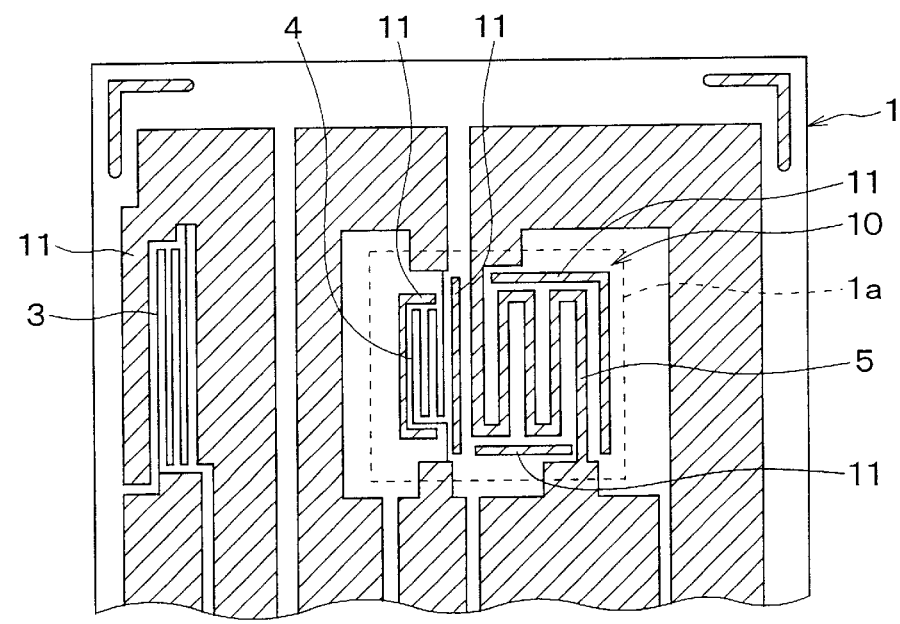
FIG. 4 is a plan view showing key parts in a third example of the flow sensor of the first embodiment.
Figure 5:
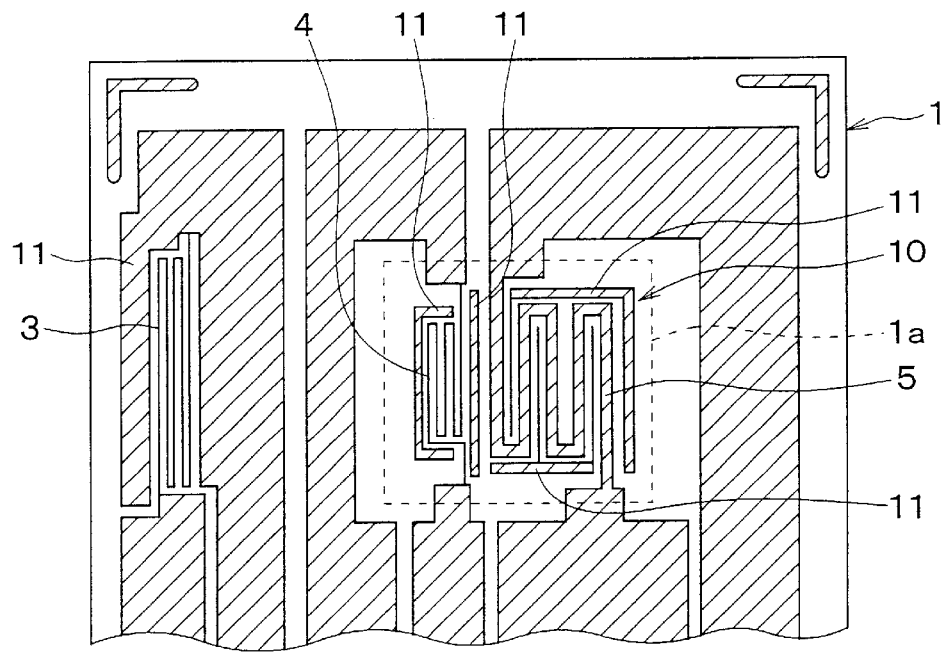
FIG. 5 is a plan view showing key parts in a fourth example of the flow sensor of the first embodiment.

For example, layout patterns for the dummy film layers 11 shown in FIG. 3 (second example of the present embodiment), FIG. 4 (third example of the present embodiment), and FIG. 5 (fourth example of the present embodiment) may be utilized.

In the second example shown in FIG. 3, the dummy film layers 11 only correspond to, or lie adjacent to, parts of the heater 5, the line width of which is relatively wide and the TCR value of which decreases to a smaller degree. On the other hand, the dummy film layers 11 substantially surround the temperature sensor 4 and the flow thermometer 3. As a result, the dummy film layers 11 (in this example) occupy much smaller areas, compared with the first example shown in FIG. 1, on the thin film structure 10 formed above the cavity 1a.

Although the device of the second example has a lesser ability to suppress decreases in the TCR values, compared with the device of the first example shown in FIG. 1, the device of the second example also reduces the areas across which the thickness of the thin film structure 10 increases, as a result of the film layers being formed, allows the thin film structure 10 to release heat more quickly, and limits the power consumed by the heater 5. In the first example, described earlier, increased heater power consumption, caused by slower heat release, is unavoidable, because the thickness of the entire thin film structure 10 increases.

Although the active parts 3, 4 and 5 are almost completely surrounded by the dummy film layers 11 in the third and fourth examples shown in FIG. 4 and FIG. 5, these examples also help minimize increases in heater power consumption, like the second example shown in FIG. 3, because the dummy film layers 11 only occupy parts of the surface of the thin film structure 10.

Second Embodiment

Figure 7:
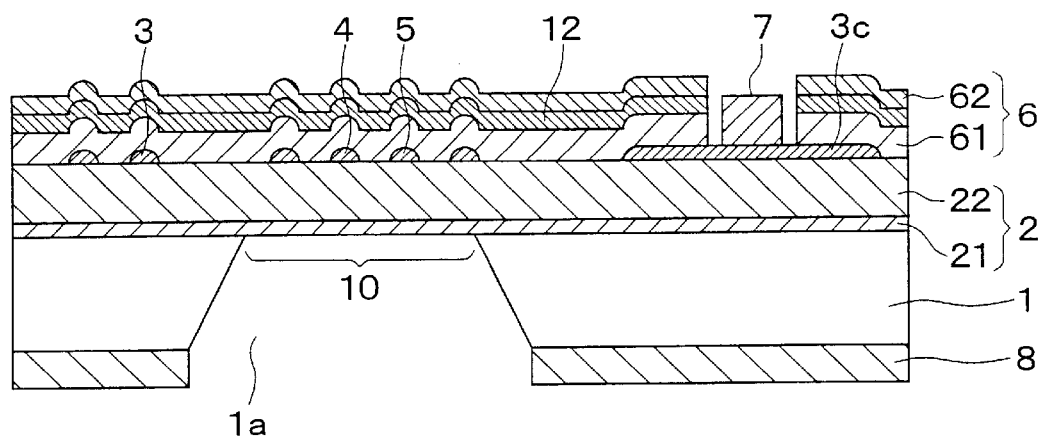
FIG. 7 is a simplified cross sectional view showing a second example of the flow sensor of the second embodiment.
Figure 8:
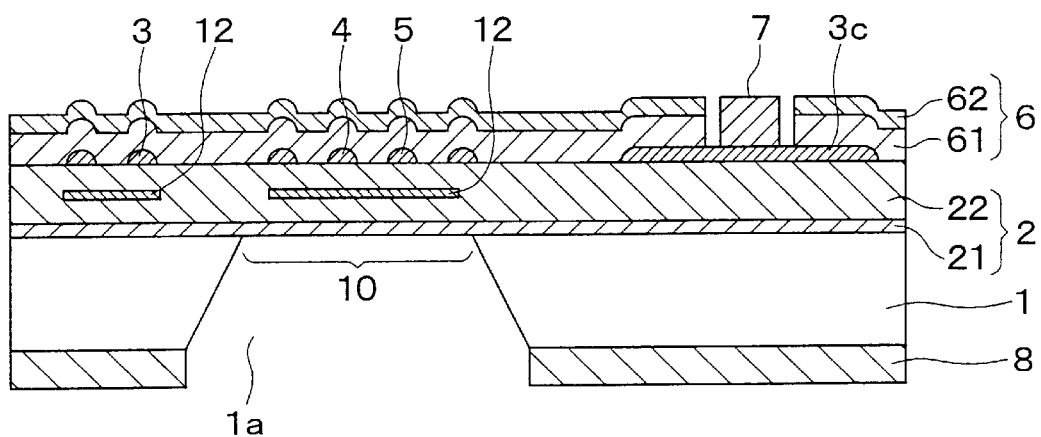
FIG. 8 is a simplified cross sectional view showing a third example of the flow sensor of the second embodiment.

FIG. 6 is a simplified cross sectional view showing a first example of a flow sensor of the second embodiment of the present invention, FIG. 7 is a simplified cross sectional view showing a second example, and FIG. 8 is a simplified cross sectional view showing a third example of the second embodiment. The cross sectional views shown in FIG. 6 through FIG. 8 correspond with FIG. 14C discussed earlier. The differences between these examples and the first embodiment will be described next.

While each dummy film layer 11 in the first embodiment (dummy layer of the first type) is placed on the same plane as the active parts 3, 4, 5, a dummy film layer 12 of the second embodiment (dummy film layer of the second type), which includes a material containing metallic oxide, is formed beneath or above and near the active parts 3, 4, 5 and is electrically isolated from the active parts 3, 4, 5.

The second type of dummy film layer 12 can be made of any metallic oxide material that will consume the reduction gas agent. In the various examples of the present embodiment, the second type of dummy film layer 12 is made of the same multilayer film, having the platinum/titanium oxide layers, used to form the active parts 3, 4, 5.

In the first example of FIG. 6, the second type of dummy film layer 12 is buried beneath the lower insulating film 2 across almost the entire surface of the substrate 1. More specifically, after the silicon nitride film 21 is deposited, the silicon oxide film 22 is deposited in two steps, with the titanium film and the platinum film deposited between the first and the second deposition steps. As the lower insulating film 2 is annealed, the heat oxidizes the titanium film and creates the second type of dummy film layer 12, in a stacked film structure including platinum and titanium oxide.

In the second example shown in FIG. 7, the second type of layer 12 is buried beneath the upper insulating film 6 across almost the entire substrate 1. More specifically, after the silicon oxide film 61 is deposited, the titanium film and the platinum film are deposited one after the other, followed by a deposition of the silicon nitride film 62. Throughout these steps, the titanium film is oxidized by heat from the deposition of the LP-SiN film 62 and annealing that follows the deposition of the PE-SiN film 62. As a result, the second type of dummy film layer 12, consisting of a stacked film with platinum and titanium oxide, is formed.

While the second type of dummy film layer 12 in the first and second examples is formed across the entire thin film structure 10 above the cavity 1a, in the third example shown in FIG. 8, dummy film layers 12 of the second type, which are buried beneath the lower insulating film 2, are formed at areas near the active parts 4 and 5 on the thin film structure 10 above the cavity 1a. The dummy film layers 12 of the second type in the third example may also be buried under the upper insulating film 6.

Furthermore, in the various examples of the present embodiment, the reduction gas agent, such as hydrogen, is generated during deposition of the LP-SiN film 62 and annealing of the PE-SiN film 62, but the reduction gas agent is consumed by the layers 12 of the second type while diffusing through the upper insulating film 6 or the lower insulating film 2.

In other words, the reduction gas agent, such as hydrogen, which concentrates at the dummy film layers 12, is consumed to reduce the metallic oxide (titanium oxide in the platinum/titanium oxide film in these examples) that make up the dummy film layers 12.

Therefore, a smaller amount of the reduction gas agent, which reduces the TCR values in the active parts 3, 4, 5, reaches the active parts 3, 4, 5. Therefore, the device of the present embodiment limits the decline in the TCR values in the active parts, such as those observed with the conventional example, as shown in FIG. 2.

Furthermore, in the third example shown in FIG. 8, layers 12 of the second type are formed only at some areas of the thin film structure 10 near the active parts 4 and 5, where the thin film structure 10 covers the cavity 1a. Because the thickness of the thin film structure 10 increases across a smaller area when the layers 12 are formed in a stacked layout, the thin film structure 10 is able to release heat more quickly. As a result, compared with the first and second examples, the third example minimizes increases in heater power consumption.

Third Embodiment

Figure 9:
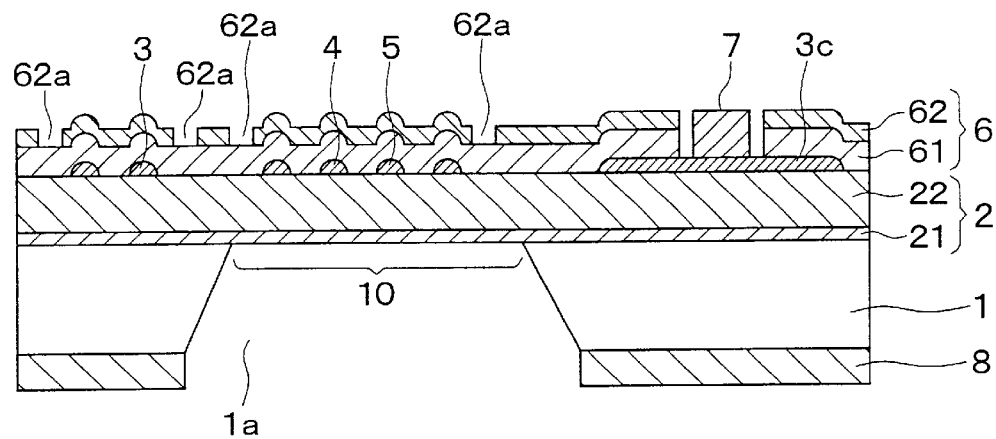
FIG. 9 is a simplified cross sectional view showing a first example of the flow sensor of the third embodiment of the present invention.
Figure 10:
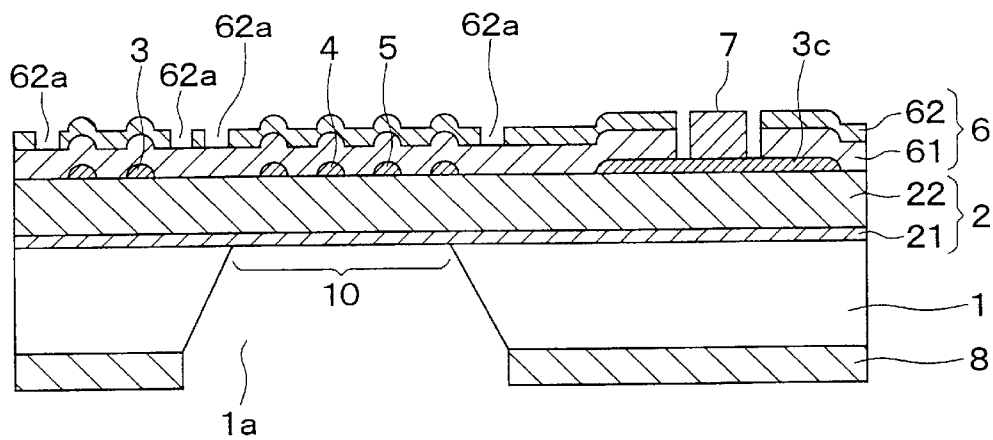
FIG. 10 is a simplified cross sectional view showing a second example of the flow sensor of the third embodiment.
Figure 11:
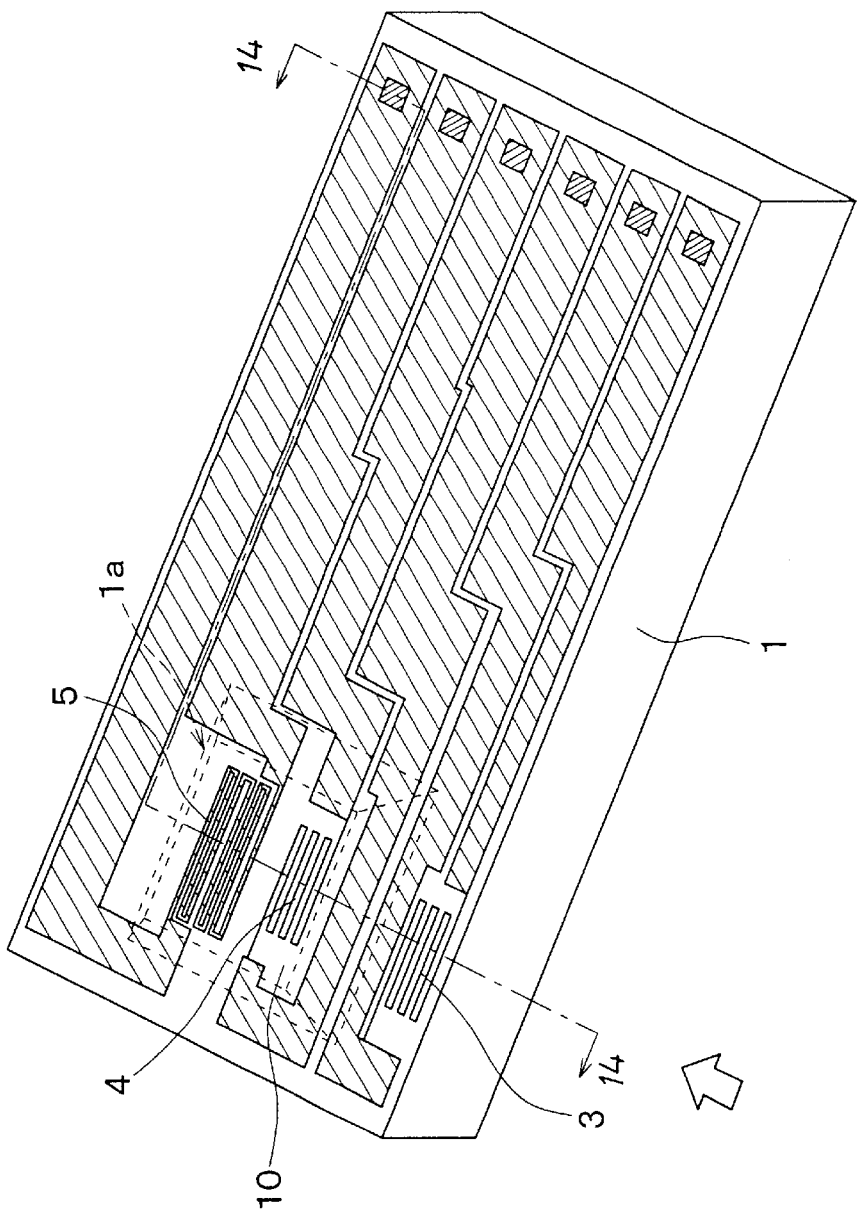
FIG. 11 is a view from an angle of a regular and conventional flow sensor.

FIG. 9 shows a simplified cross sectional view of a first example of a flow sensor of the third embodiment of the present invention, and FIG. 10 is a simplified cross sectional view showing a second example. FIG. 9 and FIG. 10 correspond to the cross sectional view in FIG. 14C. This embodiment is mainly related to a method of manufacturing.

The method of manufacturing of the flow sensor of the present embodiment includes a step for forming a lower insulating film, a step for forming an adhesion layer, a step for forming a resistor film, a step for forming active parts, a step for forming an upper insulating film, and a step for forming a cavity, like the method of manufacturing of FIGS. 13A–13D and FIGS. 14A–14C.

The step for forming the upper insulating film in the present embodiment is different from that of the method of FIGS. 13A–13D and FIGS. 14A–14C. After a silicon oxide film 61 is deposited as part of an upper insulating film 6, a silicon nitride film 62 (PE-SiN film) is deposited by a plasma CVD method. Then, as shown in FIG. 9 and FIG. 10, through holes 62a are opened into the PE-SiN film 62 around the active parts 3, 4, 5 (or above the active parts 3, 4, 5). Then the PE-SiN film 62 is annealed.

The through holes 62a may be formed by a method such as dry etching. The through holes 62a may penetrate not only through the PE-SiN film 62 but also the silicon oxide film 61 underneath.

In the first example shown in FIG. 9, the through holes 62a are opened through the PE-SiN film 62 on the thin film structure 10 above the cavity 1a, while in the second example, shown in FIG. 10, the through holes 62a are not opened in the PE-SiN film 62 above the cavity 1a but are opened instead in the PE-SiN film 62a outside of the area covering the cavity 1a.

As mentioned earlier, when the PE-SiN film 62 forming the upper insulating film is annealed at high temperature, the PE-SiN film 62 generates a reduction gas agent such as hydrogen. In the method of the present embodiment, the PE-SiN film 62 is annealed after the through holes 62a are opened through the PE-SiN film 62.

As a result, the reduction gas agent, which would diffuse from the PE-SiN film 62 toward the active parts 3, 4, 5, is instead released easily through the through holes 62a. For this reason, the present method of manufacturing helps reduce the amounts of reduction gas agent arriving at the active parts 3, 4, 5 and minimizes decreases in the TCR values in the active parts.

In the second example of the method of manufacturing of the present embodiment, the through holes 62a are formed at areas not covering the cavity 1a. Because the through holes 62a do not exist in areas of the thin film structure 10 covering the cavity 1a, the strength of the thin film structure 10 is improved.

In the present embodiment, through holes 62a should have circular or elliptical openings. When the openings for the through holes 62a have angles, stress tends to concentrate at these angles, which reduces the strength of the thin film structure. Circular or elliptical openings, on the other hand, do not have such angles and help improve the strength and reliability of the thin film structure 10.

Furthermore, the through holes 62a opened in the PE-SiN film 62 in the present embodiment may also be used as holes for anisotropic etching for opening the cavity 1a in the substrate 1.

Other Embodiments

The present embodiment is applicable to other types of thin film sensors, besides a flow sensor, such as an infrared sensor, gas sensor or humidity sensor. It is also possible for the substrate to not include a cavity.

What is claimed is:

1. A thin film sensor comprising:

a lower insulating film;

an adhesion layer, which includes a metallic oxide material a resistor film, which includes a metal, wherein the adhesion layer and the resistor film form a multilayer film; and an upper insulating film, wherein the lower insulating film, the adhesion layer and the resistor film are stacked on a substrate;

an active part, which is formed by patterning the multilayer film into a predetermined shape; and a dummy film layer, which is made of the same material that the active part is made of, wherein the film layer is located in close proximity to the active part;

wherein the dummy film layer lies adjacent to the active part and in the same plane as the active part.

2. The thin film sensor of claim 1, wherein the dummy film layer substantially surrounds the active part.

3. The thin film sensor of claim 1, wherein the dummy film layer completely surrounds the active part.

4. The thin film sensor of claim 1, wherein the adhesion layer includes titanium oxide, and the resistor film comprises platinum.

5. The thin film sensor of claim 1, wherein the upper insulating film comprises a silicon nitride film deposited by a low pressure CVD method.

6. The thin film sensor of claim 1, wherein the thin film sensor is included in a flow sensor, and the flow sensor includes a substrate in which a cavity is formed, and the thin film sensor is located above the cavity.

7. A thin film sensor comprising:

a lower insulating film;

an adhesion layer, which includes a metallic oxide material a resistor film, which includes a metal, wherein the adhesion layer and the resistor film form a multilayer film; and an upper insulating film, wherein the lower insulating film, the adhesion layer and the resistor film are stacked on a substrate;

an active part, which is formed by patterning the multilayer film into a predetermined shape; and a dummy film layer, which is made of the same material that the active part is made of, wherein the film layer is located in close proximity to the active part;

wherein the dummy film layer is embedded in the lower insulating film.

8. The thin film sensor of claim 7, wherein the adhesion layer includes titanium oxide, and the resistor film comprises platinum.

9. The thin film sensor of claim 7, wherein the upper insulating film comprises a silicon nitride film deposited by a low pressure CVD method.

10. The thin film sensor of claim 7, wherein the thin film sensor is included in a flow sensor, and the flow sensor includes a substrate in which a cavity is formed, and the thin film sensor is located above the cavity.

11. A thin film sensor comprising:

a lower insulating film;

an adhesion layer, which includes a metallic oxide material a resistor film, which includes a metal, wherein the adhesion layer and the resistor film form a multilayer film; and an upper insulating film, wherein the lower insulating film, the adhesion layer and the resistor film are stacked on a substrate;

an active part, which is formed by patterning the multilayer film into a predetermined shape; and a dummy film layer, which is made of the same material that the active part is made of, wherein the film layer is located in close proximity to the active part;

wherein the dummy film layer is embedded in the upper insulating film.

12. The thin film sensor of clam 11, wherein the adhesion layer includes titanium oxide, and the resistor film comprises platinum.

13. The thin film sensor of claim 11, wherein the upper insulating film comprises a silicon nitride film deposited by a low pressure CVD method.

14. The thin film sensor of claim 11, wherein the thin film sensor is included in a flow sensor, and the flow sensor includes a substrate in which a cavity is formed, and the thin film sensor is located above the cavity.

* * * * *